Aug. 5, 1930.  S. F. ARBUCKLE  1,772,175
HEADLIGHT FOR PRODUCING MULTICOLORED BEAMS
Filed July 7, 1927  3 Sheets-Sheet 1

INVENTOR
SAMUEL F. ARBUCKLE
BY
Chester H Bracelin
ATTORNEY

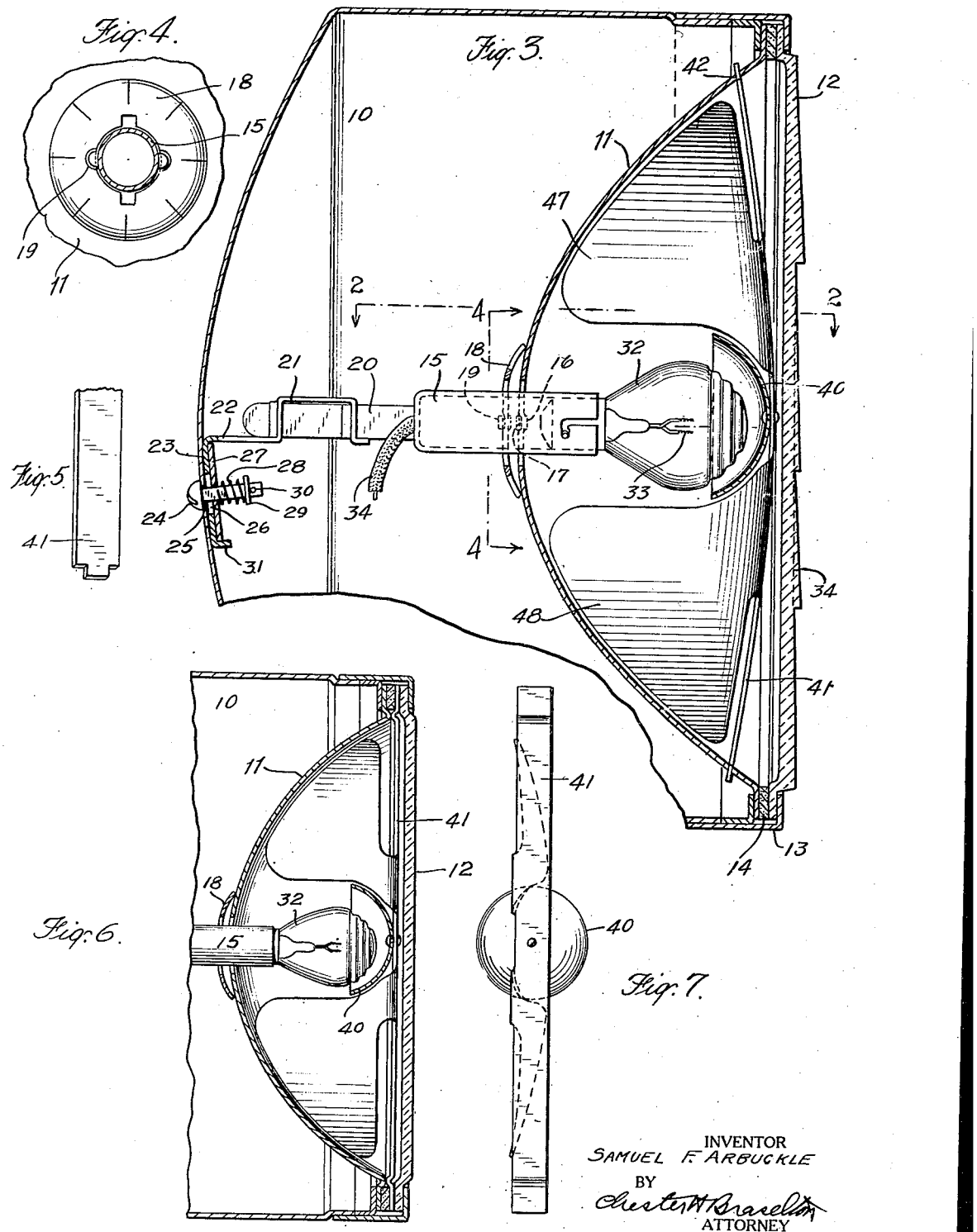

Aug. 5, 1930.  S. F. ARBUCKLE  1,772,175
HEADLIGHT FOR PRODUCING MULTICOLORED BEAMS

Filed July 7, 1927  3 Sheets-Sheet 3

INVENTOR
SAMUEL F. ARBUCKLE
BY
Chester H Braselton
ATTORNEY

Patented Aug. 5, 1930

1,772,175

UNITED STATES PATENT OFFICE

SAMUEL F. ARBUCKLE, OF HIGHLAND PARK, MICHIGAN, ASSIGNOR TO MONOGRAM LENS CORPORATION, OF DETROIT, MICHIGAN, A CORPORATION OF DELAWARE

HEADLIGHT FOR PRODUCING MULTICOLORED BEAMS

Application filed July 7, 1927. Serial No. 203,950.

This invention relates to headlights for automobiles, and particularly to means for eliminating glare therefrom.

One of the objects of the invention is to provide a headlight having a depressible beam, the depressed beam thereof being free from glare.

Another object of the invention is to provide a headlight which will produce an intense beam far down the road which will provide an easy, restful driving light substantially eliminating eye strain so commonly found in driving with headlights now in use.

Another object of the invention is to provide a headlight which will project a beam of intense white light far down the road for fast driving, and at the same time a colored light adjacent the bottom of the beam so that the road near the automobile is illumined with a soft glow which is restful to the eyes of the driver.

Another object of the invention is to provide a headlight having a depressible beam in which the depressed beam has a colored light at its upper edge, thereby reducing glare in the eyes of approaching drivers.

Another object of the invention is to provide a headlight which will utilize all of the light emitted by the light source to illuminate the road.

Another object of the invention is to provide a headlight which will project a long brilliant driving beam to illumine the road far ahead of the car, and which will at the same time illuminate the sides of the road for the purpose of reading road signs and illuminating the gutter and overhanging objects.

Another object of the invention is to provide a headlight which will produce a beam having great penetrating qualities so that it will project through fog, rain, snow or foreign matter suspended in the atmosphere.

Several embodiments of the invention have been illustrated in the accompanying drawings, in which Fig. 1 is a front view of a headlight embodying my invention;

Fig. 3 is a sectional elevation of the headlight shown in Fig. 1;

Fig. 4 is a sectional end elevation of the socket taken on the line 4—4 of Fig. 3;

Fig. 5 is a perspective view of one end of a detail of the invention;

Fig. 6 is a sectional side elevation of a modification of the invention;

Fig. 7 is a front view of a detail shown in Fig. 6; and

Like reference characters have been used to designate similar parts throughout the several views.

Figure 1:
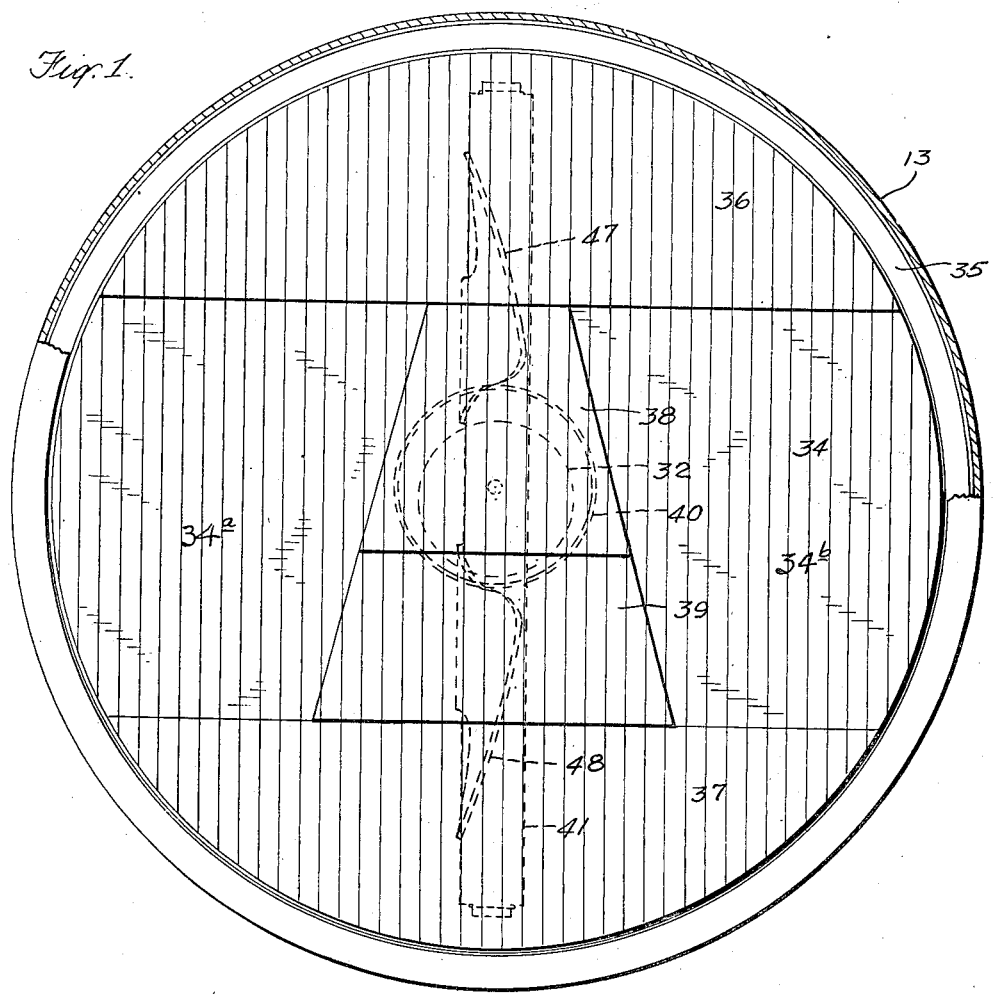

Referring more specifically to the drawings, the invention has been shown as comprising a headlight casing 10 having a reflector 11 mounted therein, and a lens 12 secured by a rim 13 against the open end of the reflector 11 and forming a closure for the front of the headlight. The usual gasket 14 of cork or other resilient material is placed between the outer flange of the reflector 11 and the periphery of the lens 12 to seal the reflector against the infiltration of dust or moisture.

At the center of the reflector 11 is placed a socket 15 held firmly against axial movement with respect to the reflector by a pair of ears 16 which are formed integrally with the socket 15 and are adapted to seat into depressions 17 in the reflector. A spring washer 18 bears resiliently against the back of the reflector at its periphery and against another pair of ears 19 attached to the socket 15. Thus, the socket is held rigidly against axial movement in the reflector but is permitted to tilt about the ears 16 as pivots and against the resiliency and frictional action of the spring washer 18.

A pliable strip 20 is attached to the rear end of the socket 15 and extends rearwardly therefrom engaging slots in both legs of a U-shaped member 21. The end 22 of one leg of member 21, is bent rearwardly and downwardly forming a plate 23 adapted to bear against the rear wall of the casing 10. The plate 23 is held against the rear wall of the casing by a pin 24 which passes through a hole 25 in the casing and through a slot 26 in the plate 23 and has mounted upon it a cam 27 which is fixed against rotation upon the pin and which is in turn held against the plate 23 by a spring 28 engaging a washer 29 held on the pin 24 by a pin 30. The lower end of the plate 23 is bent outwardly to form a flange 31 between which and the horizontally extended strip 22 the cam 27 may rotate to move the plate 23 upward and downward. It will thus be evident by rotating the pin 24, the socket 15 may be caused to pivot about the ears 16.

While I have shown and described the socket and the adjusting means, this construction forms the subject matter of application Serial No. 203,883 filed simultaneously herewith.

A light bulb 32 is shown mounted in the socket 15 by the usual pin and bayonet slot connection and containing a pair of filaments 33 adapted to be electrically connected to an external source of electric current by the wires 34 in the usual manner.

The headlight shown in the drawings has a particular relation between the focal length of the reflector, the distance between the filaments and the configuration of the lens which produces a headlight substantially insensitive to slight variations in the position of the filaments. I have found by experiment that this insensitiveness is best produced when a reflector having a focal length not less than 10½ nor more than 15 times the distance between the filaments is used, but this construction forms the subject matter of application Serial No. 203,948 filed simultaneously herewith. With the main reflector, bulb and lens as illustrated, a beam is produced having a relatively small portion of high intensity at the top and shading down with less intensity to a considerably wider portion at the bottom, and having the general configuration as illustrated diagrammatically in full lines in Figs. 8 and 9 of the drawings.

The lens comprises a disc 34 having the usual flange 35 around the periphery thereof to support the lens and clamp it in place on the headlight and a plurality of horizontal prisms. The prism 36 extends across the entire top of the lens, the prism 37 extends across the lower portion of the lens, and the two prisms 38 and 39 cover the central portion only of the lens and take the form of a trapezoid, as clearly shown in Fig. 1. The portions 34$^a$ and 34$^b$ at either side of the prisms 38 and 39, permit light rays to pass therethrough without bending and the light from these two portions of the lens forms the intense part of the beam, the light from the prims 36, 37, 38 and 39 being deflected below to form the lower less intense portion of the beam. The light projected by the prisms 38 and 39 comes from that part of the reflector most vertically sensitive to variations of the filaments and hence no light is directed above the intense part of the beam projected by the plane portions 34$^a$ and 34$^b$.

Figure 2:
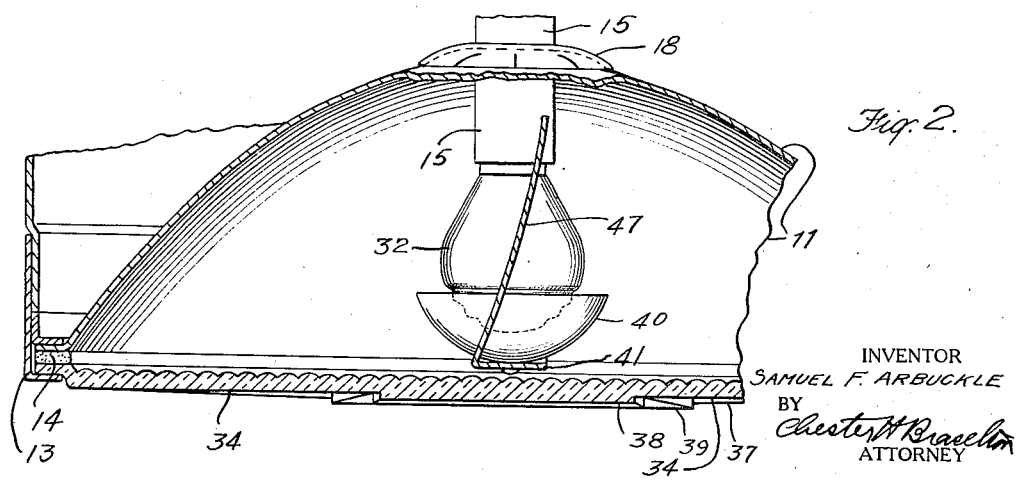
Fig. 2 is a sectional plan view of a portion of the headlight shown in Fig. 1 taken on the line 2—2 of Fig. 3.
Figure 8:
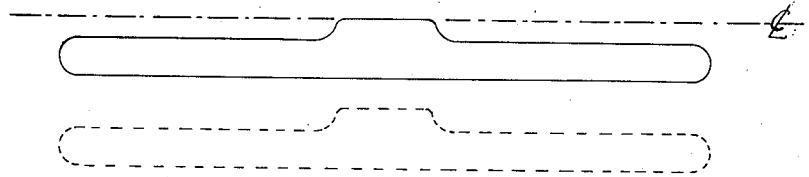
Figs. 8 and 9 are diagrammatical views of patterns of light thrown on the road by the headlight.
Figure 9:
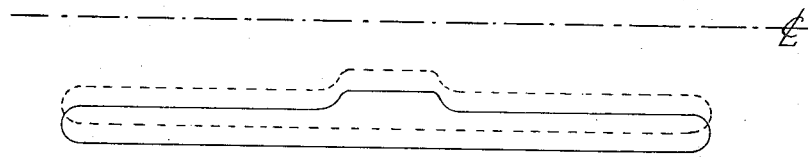

In order to utilize all of the light, I have provided a supplementary reflector 40 positioned adjacent the bulb 32 and supported by a strip 41 the ends of which are seated in slots 42 in the reflector 11. The method of supporting the supplementary reflector forms no part of the present application although it is shown here for purposes of illustration. This construction constitutes the subject matter of application Serial No. 189,483 filed simultaneously herewith. The supplementary reflector 40 is preferably spherical in form and is preferably centered slightly above the filaments 33. By moving the reflector 40 so that its center is slightly in front or in back of the focal plane of the main reflector, the beam produced by the supplementary reflector may be varied so that its cross-section may be increased or decreased to produce an auxiliary beam of the desired size. With the reflector and filaments positioned as in Figs 1, 2 and 3, the beam produced by the supplementary reflector 40 tends to supplement the lower portion of the driving beam when the lower filament is energized and to supplement the upper portion of the depressed beam when the upper filament is energized. This effect is illustrated in Figs. 8 and 9, Fig. 8 showing the patterns formed when the lower filament is lighted and Fig. 9 the patterns formed when the upper filament is lighted. Thus a driving beam is provided (Fig. 8) with the highest intensity at the top where it will be thrown far down the road, and a less intense portion at the bottom to light the road near the automobile. When the other filament is switched on, the intense portion of the beam is thrown down upon the road and the top of the beam is formed by the less intense pattern from the supplementary reflector.

I have also discovered through experimentation that if the supplementary beam produced by the reflector 40 is toned down by a color, a most desirable lighting effect is produced. In order to color this beam in one instance, I formed the supplementary reflector 40 out of copper, which when given a high polish, reflects light having a reddish brown tint and softens the upper or lower edge of the beam produced so that contrast is considerably toned down and glare and eye strain are reduced to a minimum.

The effect of this two colored beam is also illustrated in Figs. 8 and 9. With the lower filament energized, (Fig. 8) the concentrated white rays of the main reflector are sent far down the road in a piercing beam which distinctly illuminates the road so that the car may be driven safely at considerable speed. At the same time the light from the supplementary reflector is thrown downwardly to illuminate the road near the automobile with a rosy copper colored tint so that objects may be clearly distinguished, but at the same time the eye may pass over the colored light with comparatively no strain at all, such strain being easily apparent when considerable contrast is produced by the headlight. From the intense portion of the colored beam the light is gradually shaded up to the intense part of the white beam. When the upper filament is energized, the depressed beam is produced as shown in Fig. 9. In this case the reddish beam produced by the supplementary reflector occurs at the top of the beam as indicated by the dotted lines the white beam being thrown down directly in front of the car. Thus, when another car is approaching, the driver sees only the reddish glow from the supplementary reflector, as the white beams are directed down below the level of his eye. Not only does the colored light prevent glare in the eyes of the approaching driver, but I have found that it is possible to come much closer to the concentrated part of the beam with the eye after first passing through the colored beam, and thus the colored beam appears to decrease the contrast between the white beam and the surrounding darkness and permits some of the intense beam to pass into the eye without causing glare or blinding sensation.

The supporting strip 41 necessarily intercepts a portion of the light projected from the main reflector. This is not shown in the beam produced by the light because of the fact that the filaments are not point sources of light and extend slightly in front of the focal plane. This causes a convergence of light rays projected from the reflector, and these rays cross in front of the reflector, thereby covering up the apparent dark spot caused by the support 41. The rear surface of the lens is also preferably fluted to spread the rays and prevent any shadows being formed by this strip.

However, I have found it desirable to use the rays of light cut off by the support 41, and to this end I have provided two wing-shaped reflectors 47 and 48. These reflectors may be formed integrally with the support 41 if desired and are bent toward the rear of the reflector extending back to a point adjacent the main reflector. I have shown these reflectors as conforming generally to the parabolic contour of the main reflector and as spaced slightly from the supplementary reflector 40, but as is evident, they may be formed to fill up the entire space between the support 41 and the main reflector 11. These reflectors 47 and 48 are bent at an inclination and are preferably slightly convex so that light rays projecting substantially parallel to the axis of the main reflector are reflected therefrom to a point at one side of the headlight. This is particularly advantageous for lighting up the right-hand side of the road and produces enough light to readily read signs or see overhanging obstructions at the right-hand side of the road.

Care should be taken to prevent direct rays from the light source from striking the reflectors 47 and 48 as such rays are apt to be reflected toward the main reflector and then outwardly and upwardly causing glare. In order to eliminate this danger, the lower edge of the upper reflector 47 and the upper edge of the lower reflector 48 should be approximately in a vertical plane through the filaments.

The reflectors 47 and 48 may be silvered or they may be formed of copper similar to the reflector 40. When formed of copper, they have the advantageous result of illuminating the side of the road with a soft reddish brown glow which in no wise detracts from the illumination of the center of the road. Other headlights have been used which throw a portion of white light toward the right-hand side of the road but as the eye automatically picks out the center of an illumination, when driving at night the driver has a tendency to turn toward the side of the road and must constantly pull the car back into the center of the road to avoid running into the ditch. With the present invention, the white light is centered on the center of the road, and the driver will automatically therefore, tend to keep in the center of the road.

In Figs. 6 and 7 I have shown a modification of the invention wherein the supplementary reflector is mounted between the lens 12 and the gasket 14 which seals the mouth of the reflector. With this construction it would be possible to fit any headlight with the supplementary reflector and side reflectors by providing the same mounted upon a long, thin strip which may be cut off at the proper length to fit any size headlamp.

If desired, the side reflectors 47 and 48 may be eliminated and the supplementary reflector 40 may be shaped or fluted so as to project a more diffused light, and thereby light up the sides of the road. I have found that by etching or stippling a horizontal strip across the reflecting inside surface of the supplementary reflector 40 a very desirable lighting effect may be produced. In this case, the colored beam will not have a definite outline as indicated in Figs. 8 and 9, but will spread itself from side to side across the road, producing a soft pleasant glow and effectively lighting both sides of the road. Some of the light from the horizontal strip re-reflected from the main reflector passes through the plane portions 34$^a$ and 34$^b$ of the lens, which give it the least spread and hence produces a splotch of colored light at the bottom of the upper beam, while the remainder of the light reflected from the strip is reflected at large angles producing such a divergent beam as to adequately light up the sides of the road as well as overhanging objects. This wide diffusion of light also helps in the matter of glare for approaching drivers, as it produces a soft glow which the driver of the approaching car enters when within about fifty or sixty feet of the car when he is still out of any portion of the main projected beam and gives him illumination at both sides of the road back to the front of the car which he might not obtain with his own headlights.

When used without the side reflectors 47 and 48 I have found it desirable to polish the inside of the strip 41, which may be made of copper or otherwise colored, so that it will reflect rays at a large angle and therefore add to the general effect obtained by etching or stippling a portion of the auxiliary reflector.

It should be noted that the copper colored light reflected from the auxiliary reflector is located at the long wave length end of the spectrum with the ability, consequently, to penetrate fog, rain, snow or foreign matter suspended in the atmosphere which greatly increases the usefulness of the headlight under any climatic conditions.

While I have described the invention as used in connection with the two filament bulb, it is to be understood that a single filament bulb gives excellent results with the supplementary reflector to produce a colored beam to supplement the beam of the main reflector.

And while I have described the supplementary reflector as being formed of copper to produce a copper colored light, it is also to be understood that many other colors may be used with excellent results, and that the color may be produced in other ways, such as by coloring the extreme end of the bulb.

Having thus described my invention, what I claim is:

In a headlight, a reflector having a focal point; a two-filament light bulb in said reflector with the filaments adjacent said focal point and in a focal plane thereof; and a concave supplementary spherical reflector mounted in opposition to said main reflector having a different color than said main reflector, said spherical reflector being positioned adjacent the bulb with its center above the filaments and slightly out of the focal plane of the main reflector, whereby it will redirect forwardly directed direct rays from said filaments and project from said main reflector independent beams having a different color from said main beams and having a slight angularity therewith but of substantially the same cross-sectional shape and size.

In testimony whereof, I affix my signature.

SAMUEL F. ARBUCKLE.